Feb. 6, 1951
A. E. KRACH
2,540,396
TWO-PIECE TRIM PANEL FASTENER
Filed Aug. 20, 1948
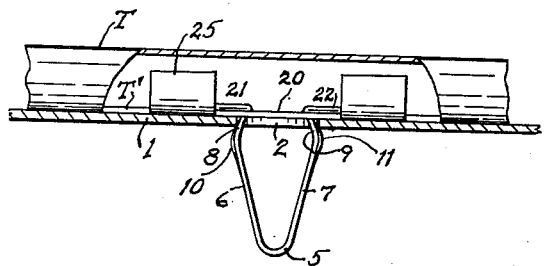
FIG. 1
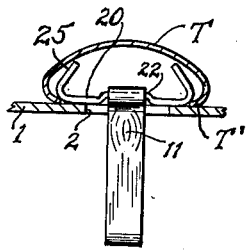
FIG. 2
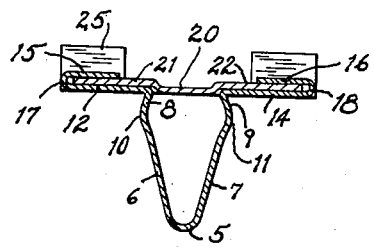
FIG. 3
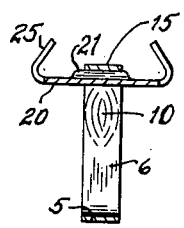
FIG. 4
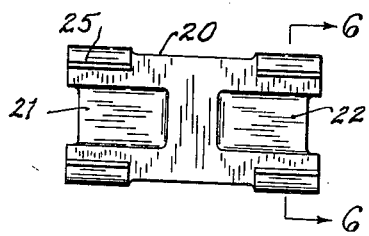
FIG. 5
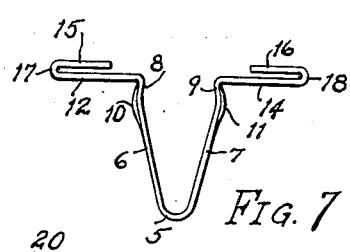
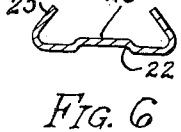
FIG. 6
FIG. 7
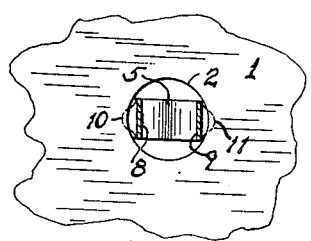
FIG. 8
INVENTOR.
ANTHONY E. KRACH,
BY
Justin E Mackli
ATTY Patented Feb. 6, 1951

2,540,396

UNITED STATES PATENT OFFICE 2,540,396

TWO-PIECE TRIM PANEL FASTENER

Anthony E. Krach, Cleveland, Ohio, assignor to The Cuyahoga Spring Company

Application August 20, 1948, Serial No. 45,237

7 Claims. (Cl. 24—73)

This invention relates to fastening devices for securing trim channel to the surfaces of metal plates such as cabinets, wall coverings, automobile bodies, fenders, and various analogous uses of channel.

The fastening device of the present invention is of a type having a part passing through an opening in the plate and having a head member engaging inturned flanges on the trim channel to be secured thereto. In many such instances it is desirable that the opening through which the fastener extends should be closed while the fastener is in position therein. For example, in use with automobile trim it is desirable to prevent water splashing through the fastener opening and becoming trapped in the trim channel. In other instances, it is desirable that air circulation be prevented to exclude dust from cabinets, etc.

The objects of the present invention include the provision of a simple effective trim fastener of the general nature and for such uses as those shown in the patents, No. 2,221,009, granted November 12, 1940, and No. 2,283,151, granted May 12, 1942, to John H. Van Uum; and which shall have provision for effecting snap engagement with inturned flanges of a hollow trim channel; and which shall tightly hold the channel to a plate support by means of a yieldable loop passing through an opening therein; and which shall have a head member serving as a trim channel engaging means and in which the head member is so constructed as to fit over and tightly close the opening in the plate support.

Specific objects include effecting this tight engagement with the plate support opening while holding the closure head member tightly thereagainst, and without interfering with the effective spring snap fastener action of the securing device.

Other more specific objects and advantages will become apparent in the following description which relates to the accompanying drawings illustrating a preferred embodiment of my invention.

In the drawings:

Fig. 1 is a section through a supporting plate and trim channel secured thereto, and showing the fastening device in side elevation;

Fig. 2 is a section through the trim channel and supporting plate taken at right angles to Fig. 1, and showing an end or edge elevation of the fastening device;

Fig. 3 is a section on a plane, parallel to Fig. 1, through the fastening device itself;

Fig. 4 is a transverse section at right angles to the plane of Fig. 3;

Fig. 5 is a plan view of the head members;

Fig. 6 is a section taken on a plane indicated by the line 6—6 of Fig. 5;

Fig. 7 is an elevation of the spring fastener strip removed from the head;

Fig. 8 is a section through the fastener at the surface of the plate.

As illustrated, T designates a trim channel which is arched, as shown, and has inwardly curved sides and inturned flanges at T' which are engaged by my fastener to be held to the supporting plate or panel 1, having an opening 2 therethrough for receiving the spring action fastener element.

My present spring clip retaining device comprises a head member adapted to engage the trim channel, and a looped spring member connected therewith and engaging the opening in the supporting plate. The spring member comprises a single strip of flat spring metal bent midway between its ends at 5 to form the nose of a loop, formed with outwardly flaring leg members 6 and 7 and inwardly turned members 8 and 9.

The spring strip is bent to form two arm portions 12 and 14 extending outwardly in a plane from the members 8 and 9, and which arm portions may lie against the surface of the supporting plate 1.

As a means for engaging and holding a head plate 20 the ends of the strip are bent at 17 and 18, bringing the end portions 15 and 16 into parallelism with the arm members 12 and 14.

Facilitating the entering movement and holding action in engagement with the opening 2, rounded bulges 10 and 11 are formed at the knees or outwardly projecting portions between the members 6 and 8 and 7 and 9, respectively.

The spring strip thus far described, as will be understood, is adapted to be thrust through the opening 2, springing the leg members and rounded knees 10 and 11 yieldingly inwardly until the members 12 and 14 lie against the surface of the plate 1 where the expanding spring action of the loop forces the members 8 and 9 and 10 and 11 into holding engagement with the opening 2.

A trim channel engaging plate-like closure or head member 20 may be stamped and formed from a flat piece of metal, preferably somewhat resilient, shown as being oblong and as having its end portions provided with upwardly offset areas 21 and 22 to lie over and fit along the top and edges of the members 12 and 14. The end portions may be notched inwardly slightly as shown in Fig. 5. Here, as appears in Fig. 3, a slight clearance for movement of the loops or bends 17 and 18 is permitted as the loop contracts to enter the hole 2, while the members 15 and 16 slidingly engage the upper surfaces of the offset areas 21 and 22.

At the sides of the plate member 20 and preferably for a short distance at each end, are formed upwardly turned inwardly sloping ears 25 over which the edges T' of the trim channel flanges may slide and spring into the gripping engagement shown in Figs. 1 and 2.

The width of the strip forming the spring clip portion and the shape and contour of the upwardly offset portions 21 and 22 are such as to form rather close fit at the edges of the strip, over the arm portions 12 and 14, and it will be seen that the plate 20 thus forms a tight and complete closure of the opening 2 extending past from the edge of this opening a substantial distance in all directions.

Likewise, it will be seen, that the plate 20 and its fingers 25 form a head member providing a snap fastener engagement with the channel, while the spring clip member provides for a snap fastener engagement with the panel or plate 1.

The composite retaining device described may be cheaply manufactured. It is effective in use and is easily applied both to the opening of the supporting plate and readily engaged with the trim channel.

Various modifications of the structure shown may be made without departing from the spirit and intent of the invention as defined in the appended claims.

I claim:

1. A spring clip retaining device for trim channel comprising a strip of spring metal formed to provide an intermediate loop adapted for compressible and expansible yieldable engagement with an aperture in a support and having laterally extending arms arranged to lie along the surface of the support on the side opposite the loop, and said arms being provided with inwardly turned end portions, and a head plate member engaged by said end portions and held thereby against the support to cover said aperture and having shoulders adapted to engage inturned flanges of a trim channel member.

2. A spring clip retaining device for trim channel, comprising a strip of spring metal formed to provide an intermediate loop adapted to project through and yieldably engage an aperture in a support, said strip having laterally extending arms fitting against the surface of the support on the side opposite the loop and provided with inwardly turned end portions, and a closure head plate member engaging said end portions and also adapted to lie against the support and to cover said aperture, said plate member having shoulders adapted to engage inturned flanges of a trim channel member, and said closure member being offset to fit over the said arms to permit the surrounding portion of the plate to fit closely against the surface of the support.

3. A spring clip retaining device for holding trim channel, having an open side and inturned flanges, to a rigid support having an aperture therein, said device comprising a spring strip having a loop shaped to yieldably engage said opening, and said strip having arms extending away from the loop and outwardly from the opening and adapted to lie along the surface of the support and having inturned hook portions spaced therefrom at the ends of the arms, a head member adapted to lie over and close the aperture and having trim channel engaging surfaces at its edges, said hook portions engaging the head member being adapted to allow sliding movement permitting the spring action of the loop for its entering and holding engagement with the aperture.

4. A composite spring clip retaining device comprising two members, one member being an intermediately looped spring strip shaped to be forced through an aperture in a support and to effect holding engagement therewith, and said strip having arms lying along and against the other side of the support from that of the loop, a closure head member, said arms having return bends at their ends adapted to embrace the said head member, the latter member comprising a flat plate having means adapted to engage the flanges of a trim channel, said head plate member serving to cover the aperture when the loop is in retaining position.

5. The structure defined in claim 4 in which said channel engaging means comprise inwardly turned upwardly extending portions at the corners of the plate member for yieldingly engaging the inturned edges of the trim channel.

6. A composite spring clip retaining device for trim channel, said device comprising a head member and a spring strip member being intermediately looped and shaped to be forced through an aperture in a support and to effect holding engagement therewith and having arms lying along and against the other side of the support from that of the loop, and said arms having return bent ends thereon adapted to slidably embrace opposite ends of the said head member and hold it against the support, said head member comprising a flat plate having offset portions fitting over said arms and permitting the plate to be in close contact with the support, and having upturned side members adapted to engage inturned flanges of a trim channel, said head plate member serving to cover and tightly close the aperture when the loop is in retaining position.

7. A composite spring clip retaining device comprising a spring member and an oblong plate-like head member, the spring member comprising a flat strip bent to form a retaining loop adapted to be pressed through and expand into holding engagement with the edge of an aperture in a supporting plate, the head member being adapted to be sprung into and engage the inturned flanges of a trim channel member to be thus secured to said support, the spring loop member having outwardly extending arms lying flat along the surface of the support at the side thereof opposite that engaged by the loop when in position, and having return bends forming parallel gripping surfaces slidably engaging the ends of the head closure member, the head closure member being offset over said arm portions to permit it to lie against the support and being of a size such as to cover and close the aperture.

ANTHONY E. KRACH.

REFERENCES CITED

The following references are of record in the file of this patent:

UNITED STATES PATENTS

| Number | Name | Date |
|---|---|---|
| 2,139,567 | Van Uum | Dec. 6, 1938 |
| 2,142,429 | Wiley | Jan. 3, 1939 |
| 2,223,622 | Kost | Dec. 3, 1940 |